United States Patent
Rolandi et al.

(10) Patent No.: US 6,429,634 B2
(45) Date of Patent: Aug. 6, 2002

(54) VOLTAGE BOOSTING DEVICE, IN PARTICULAR FOR SPEEDING POWER-UP OF MULTILEVEL NONVOLATILE MEMORIES

(75) Inventors: Paolo Rolandi, Voghera; Massimo Montanaro, Pavia; Giorgio Oddone, Rossiglione, all of (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/778,330

(22) Filed: Feb. 6, 2001

(30) Foreign Application Priority Data

Feb. 8, 2000 (EP) .............................. 00830088

(51) Int. Cl.[7] ................................................ G05F 1/40
(52) U.S. Cl. ..................................................... 323/282
(58) Field of Search ................................ 323/266, 273, 323/282, 312, 313; 327/538, 539, 534, 536

(56) References Cited

U.S. PATENT DOCUMENTS

| | | | |
|---|---|---|---|
| 5,602,506 A | 2/1997 | Kim et al. | 327/535 |
| 5,880,622 A | 3/1999 | Evertt et al. | 327/535 |
| 5,883,501 A | 3/1999 | Arakawa | 323/222 |
| 6,002,630 A | * 12/1999 | Chuang et al. | 365/226 |
| 6,097,628 A | * 8/2000 | Rolandi | 365/185.03 |
| 6,101,121 A | * 8/2000 | Rolandi | 365/185.03 |
| 6,249,112 B1 | * 6/2001 | Khouri et al. | 323/282 |

FOREIGN PATENT DOCUMENTS

| | | |
|---|---|---|
| EP | 0 800 259 A1 | 10/1997 |
| EP | 0 800 260 A1 | 10/1997 |
| EP | 0 899 742 A1 | 3/1999 |

* cited by examiner

*Primary Examiner*—Adolf Deneke Berhane
(74) *Attorney, Agent, or Firm*—Lisa K. Jorgenson; E. Russell Tarleton; Seed IP Law Group PLLC

(57) ABSTRACT

A voltage boosting device for speeding power-up of multilevel nonvolatile memories, including a voltage regulator and a charge pump and having an output terminal; the voltage regulator having a regulation terminal connected to the output terminal, and an output supplying a control voltage; the read charge pump having an output connected to the output terminal and supplying a read voltage. The device further includes an enable circuit connected to the output and having a pump enable output connected to a charge pump enable terminal and supplying a pump enable signal. The pump enable signal is set at a first logic level so as to activate the charge pump when the read voltage is lower than a nominal value. In addition, the device generates a power-up sync signal which activates a read operation when the read voltage reaches its nominal value and a chip enable signal is set at an active value.

18 Claims, 3 Drawing Sheets

VOLTAGE BOOSTING DEVICE, IN
PARTICULAR FOR SPEEDING POWER-UP
OF MULTILEVEL NONVOLATILE
MEMORIES

TECHNICAL FIELD

The present invention refers to a voltage boosting device, and in particular for increasing the speed of power-up of multilevel nonvolatile memories.

BACKGROUND OF THE INVENTION

As is known, in order to correctly read multilevel nonvolatile memories, it is necessary to supply the memory cells to be read with high voltages, i.e., higher than the supply voltages normally available. For this purpose, voltage boosting devices are employed that use voltage boosters (charge pumps) that are able to raise the voltage above the supply voltage, together with regulator stages for stabilizing the read voltage at around the nominal values required.

According to a very widespread design, a first charge pump, with low consumption and low performance, is kept in continuous operation, also in standby conditions, whereas a second charge pump, with high performance, intervenes only when the memory is in the active state. In practice, the low consumption pump has the purpose of compensating the discharging of the high voltage nodes that is due to inevitable leakage currents during the standby state. Since these leakage currents are normally somewhat contained, the low consumption pump, albeit having a low level of performance, is sufficient for the purpose.

Since the read voltage at input of the memory in the active state is already at the desired value and it is not necessary to raise it any further, reading upon re-entry from the standby condition is rendered faster, and the memory is, as a whole, faster. In addition, since the pump used in standby absorbs a very low power, consumption of the memory is not significantly increased.

Known devices, however, present a number of drawbacks. In fact, if at power-up it is not immediately necessary to carry out operations of memory programming or reading, the memory itself is set in standby. In this case, the high performance pump is deactivated, and the read voltage must be brought to the nominal value by means of the low consumption pump, which, however, is not able to supply high charge currents. Consequently, the time required for the memory to reach nominal operating conditions, such as to guarantee proper execution of the programming and, in particular, reading, is long.

On the other hand, even when reading is requested immediately at power-up and the memory is set in the active state, the memory is not able to carry out the operations requested. In order to prevent errors, in fact, the read voltage must stabilize at around the nominal value; consequently, it is necessary to wait for a clock cycle for the generation of a sync signal (normally called ATD) which enables reading. Thus, the time required for accessing the content of the memory following the power-up phase is long and represents a limitation of the performance of the memory itself.

SUMMARY OF THE INVENTION

The disclosed embodiment of the present invention provides a device for raising the voltage which, in a nonvolatile memory, allows a read voltage to rapidly reach a nominal value, in particular where at power-up the memory is set in standby.

A voltage boosting device is provided, the device including a voltage regulator and a charge pump having an output terminal supplying a read voltage at a nominal value, the voltage regulator having a regulation terminal connected to the output terminal and a control output supplying a control voltage that has a first control level when the read voltage is lower than a preset value; the recharge pump having an enable terminal and an output connected to the output terminal; and an enable circuit having a first input connected to the control output, a second input receiving a power-up signal, and a pump enable output connected to the enable terminal of the charge pump and supplying a pump enable signal, the pump enable signal being set at a first logic level for activating the charge pump at least upon receiving the power-up signal.

In accordance with another aspect of the invention, the enable circuit includes a memory circuit having an input connected to the second input of the enable circuit and an output supplying a power-up memory signal switching to a first level upon receiving the power-up signal; and an activation circuit having inputs connected to the control output and to the first node, and an activation mode connected to the pump enable terminal for supplying the pump enable signal in the presence of the first level of a bistable reset signal and as long as the control voltage has the first control value.

In accordance with another aspect of the invention, the enable circuit includes a memory circuit having an input connected to the second input of the enable circuit, and an output supplying a power-up memory signal switching to a first level upon receiving the power-up signal and also including a sync stage having a first input, a second input, and a sink output, the first input and the second input of the sink stage connected, respectively, to the output of the memory circuit and to a chip enable terminal supplying a chip enable signal, and the sync output supplying a power-up sync signal having a pulse when the read voltage reaches the nominal value and the chip enable signal is set at an active value.

BRIEF DESCRIPTION OF THE DRAWINGS

For a better understanding of the invention, an embodiment thereof is now described, as a non-limiting example, with reference to the attached drawings, wherein.

DETAILED DESCRIPTION OF THE
INVENTION

Figure 1:
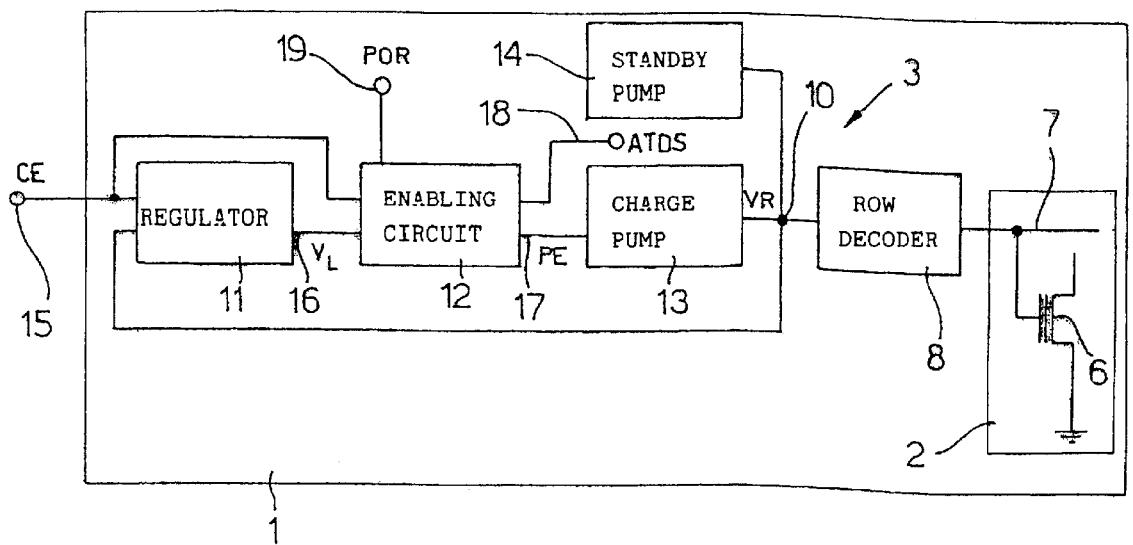
FIG. 1 shows a block diagram of a voltage boosting device according to the present invention.

Referring initially to FIG. 1, shown therein is a memory 1 that includes a memory array 2 comprising a plurality of memory cells 6 arranged in rows and columns. In particular, the memory cells 6 belonging to a same row have their respective gate terminals connected to a word line 7. A row decoder 8, of known type, selectively connects one of the word lines 7 of the memory array 2 with an output terminal 10 of the voltage boosting device 3.

The voltage boosting device 3 comprises a voltage regulator 11, an enabling circuit 12, a read charge pump 13, and a standby charge pump 14. The read charge pump 13 is of high performance and high consumption type, and is activated only at power-up and during active operation of the memory 1; the standby charge pump 14 is of low consumption and low performance type, and is kept in continuous operation, even in the standby condition.

The voltage regulator 11 has a regulation terminal connected to the output terminal 10 and an input connected to a chip enable terminal 15 of the memory 1, on which a chip enable signal CE is present, which is generated by a control unit of known type, which is not shown. In addition, an output 16 of the voltage regulator 11 is connected to the enable circuit 12 and supplies a control voltage $V_L$.

The enable circuit 12, which will be illustrated in detail hereinafter, has an input connected to the chip enable terminal 15, from which it receives the chip enable signal CE, and a reset terminal 19, which receives a power-up signal POR generated by a reset circuit in itself known, which is not shown in the figures. Furthermore, the enable circuit 12 has a pump enable output 17 supplying a pump enable signal PE, and a sync output 18 supplying a power-up sync signal ATDS.

The read charge pump 13 has an enable terminal connected to the pump enable output 17, and an output connected to the output terminal 10 of the voltage boosting device 3 and supplying a read voltage $V_R$.

Figure 4:
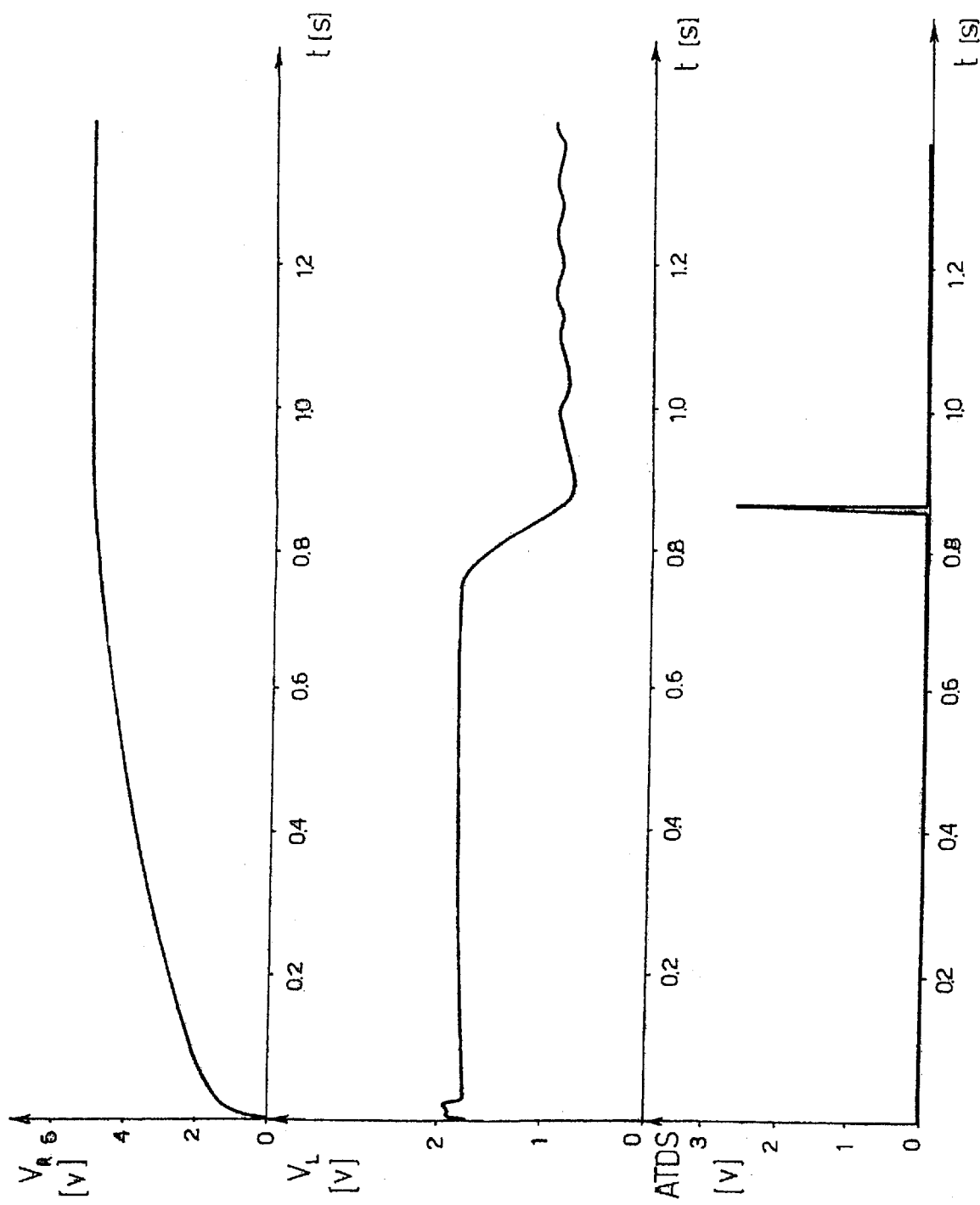
FIG. 4 shows the plots of selected electrical quantities taken on the diagram of FIG. 1.

At power-up of the memory 1, the read voltage $V_R$ on the output terminal 10 is lower than a nominal value (FIG. 4). In this condition, the control voltage $V_L$ supplied by the voltage regulator 11 is at a first control value, at which the enable circuit, as will be described in detail in what follows, brings the pump enable signal PE to a first logic level, for example a high logic level, thus activating the read charge pump 13. The read voltage $V_R$ thus starts increasing until it reaches the nominal value, around which it is subsequently maintained by the voltage regulator 11 (FIG. 4). In addition, the control voltage $V_L$ supplied by the voltage regulator 11 decreases, remaining around a second control value (FIG. 4).

In this situation, if, after the power-up phase the chip enable signal CE is at a non-active level (normally a high logic level), the memory 1 is set in standby, and the enable circuit 12 brings the pump enable signal PE to a second logic level, for example a low logic level, so that the read charge pump 13 is deactivated. The standby charge pump 14 remains, instead, active. If, on the other hand, reading is requested immediately, and hence the chip enable signal CE is at an active level (normally a low logic level), the enable circuit 12, at the moment in which the read voltage $V_R$ reaches the nominal value, causes the power-up sync signal ATDS to present a pulse (FIG. 4), as will be clarified later, and, moreover, supplies the first logic level of the pump enable signal PE, and thus maintains the read charge pump 13 in operation.

Figure 2:
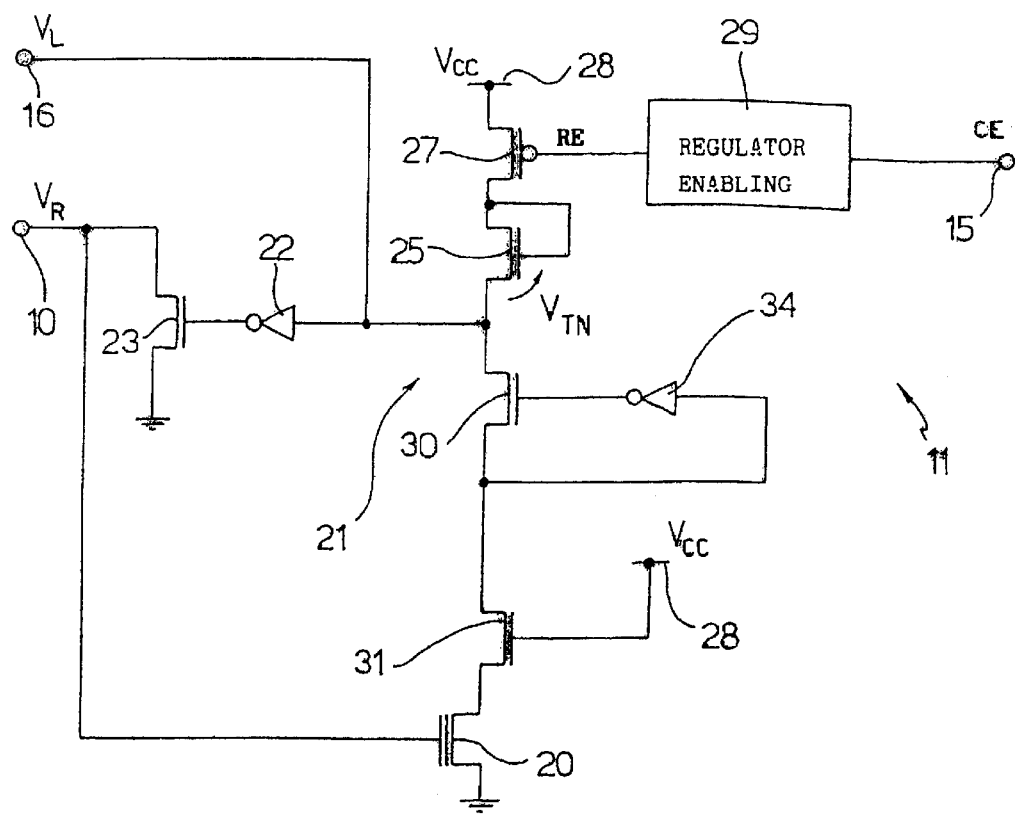
FIG. 2 shows a simplified circuit diagram of a first block of the device of FIG. 1.

The voltage regulator 11 can be made as will now be briefly described to enable a better understanding, with reference to FIG. 2.

As shown in this figure, the voltage regulator 11 comprises a reference cell 20, a resistive branch 21, a driving inverter 22, and a regulation transistor 23.

The reference cell 20 has its gate terminal connected to the output terminal 10 of the voltage boosting device 3, its source terminal grounded, and its drain terminal connected to the resistive branch 21. In addition, the reference cell 20 has a threshold voltage whereby it starts conducting current when the read voltage $V_R$ on the output terminal 10 exceeds the nominal value.

The resistive branch 21 comprises a resistive transistor 25, of implanted NMOS type, having its source terminal connected to the output 16 of the voltage regulator 11, its drain terminal and gate terminal connected together and, via a PMOS interrupt transistor 27, to a supply line 28 supplying a voltage $V_{CC}$. The gate terminal of the interrupt transistor 27 receives a regulator enable signal RE generated by a regulator enable circuit 29—which is per se known and not shown in detail—connected to the chip enable terminal 15. In particular, at power-up of the memory 1, the regulator enable signal RE has a low logic level, corresponding to a voltage value of approximately 0 V, and, after the read voltage $V_R$ has reached the nominal value, this value is equal to the chip enable signal CE.

A first biasing transistor 30 and a second biasing transistor 31 are connected in series between the output 16 of the voltage regulator 11 and the drain terminal of the reference cell 20. In addition, the first biasing transistor 30 has its source terminal and gate terminal connected together via an inverter 34, while the second biasing transistor 31 has its gate terminal connected to the supply line 28.

The driving inverter 22 connects the output 16 of the voltage regulator 11 to the gate terminal of the regulation transistor 23, which moreover has its drain terminal and source terminal connected, respectively, to the output terminal 10 and to ground.

At power-up of the memory 1, the regulator enable signal RE is brought to a low level and turns on the interrupt transistor 27. However, given that the read voltage $V_R$ is lower than the nominal voltage, the reference cell 20 is inhibited, and the resistive branch 21 does not conduct current. Consequently, the control voltage $V_L$ on the output 16 of the voltage regulator 11 is at a value given by the following expression:

$$V_L = V_{CC} - V_{TN} \quad (1)$$

where $V_{TN}$ is the threshold voltage of the resistive transistor 25, having a value of, for example, 1 V. Expression (1) moreover defines the first control value of the control voltage $V_L$. In the presence of this first control value, the driving inverter 22 keeps the regulation transistor 23 off.

When the read voltage $V_R$ reaches the nominal value, the reference cell 20 starts conducting, and, consequently, in the resistive branch 21 a current starts flowing which causes a decrease in the control voltage $V_L$ (approximately down to the second control value—FIG. 4) and causes switching of the driving inverter 22. The regulation transistor 23 is thus turned on and enables discharging of the output terminal 10, so that the read voltage $V_R$ will not exceed the nominal value.

Figure 3:
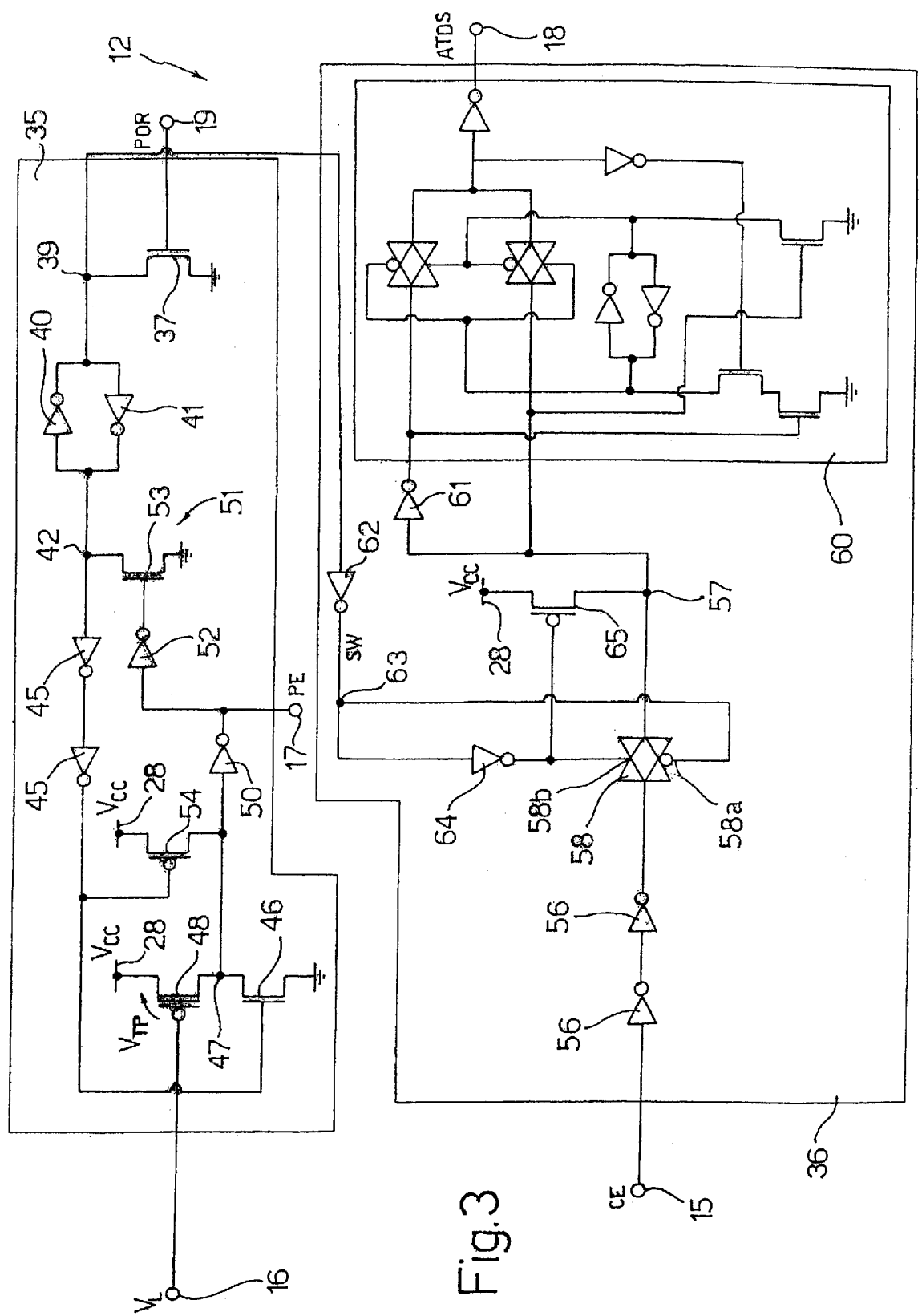
FIG. 3 shows a simplified circuit diagram of a second block of the device of FIG. 1.

FIG. 3 is a detailed diagram of the enable circuit 12, which comprises an enable stage 35 and a sync stage 36.

In the enable stage 35, an NMOS power-up transistor 37 has its source terminal and drain terminal connected, respectively, to ground and to a first node 39, and its gate terminal connected to the reset terminal 19.

A first confirm inverter 40 and a second confirm inverter 41, which are connected together back-to-back, are coupled between the first node 39 and a second node 42.

A chain of delay transistors 45 (two in the example) connects the second node 42 to a gate terminal of an activation transistor 46. The activation transistor 46 moreover has its source terminal grounded and its drain terminal connected to an activation node 47. A PMOS natural transistor 48 has its drain terminal connected to the activation node 47, its source terminal connected to the supply line 28, and its gate terminal connected to the output 16 of the voltage regulator 11. Since during the fabrication process the natural transistor 48 has not undergone implantation for threshold modification, it has a natural threshold voltage $V_{TP}$ higher than that of standard transistors and, in particular, higher than the threshold voltage $V_{TN}$ of the resistive transistor 25 (FIG. 2). For example, the natural threshold voltage $V_{TP}$ is 1.5 V. The activation transistor 46 and the natural transistor 48 make up an activation branch for the read charge pump 13.

An output inverter 50 is arranged between the activation node 47 and the pump enable output 17 of the enable circuit 12, and supplies the pump enable signal PE.

A reset circuit 51, connected between the pump enable output 17 and the second node 42, comprises a reset inverter 52 and a reset transistor 53. In particular, the reset inverter 52 is arranged between the pump enable output 17 and a gate terminal of the reset transistor 53, which moreover has its source terminal grounded and its drain terminal connected to the second node 42.

A PMOS confirm transistor 54 is connected between the supply line 28 and the activation node 47, and has its gate terminal connected to the gate terminal of the activation transistor 46.

The sync circuit 36 comprises a pair of inverters 56 which allow TTL-CMOS level adaptation, are arranged in series together, and connect the chip enable terminal 15 of the memory 1 to an excitation node 57 through a transfer gate 58.

A monostable circuit 60 has a first input connected to the excitation node 57 directly, and a second input also connected to the excitation node 57, but through a phase inverter 61, and an output forming the sync output 18 and supplying the power-up sync signal ATDS.

An input inverter 62 is arranged between the first node 39 of the enable stage 35 and a control node 63 connected directly to a first control terminal 58a of the transfer gate 58 and, through a control inverter 64, to a second control terminal 58b. A control signal SW is present on the control terminal 63 and brings the transfer gate 58 alternately into a conduction state or an inhibition state. In particular, the transfer gate 58 is brought into the conduction state when the control signal SW is at the low logic level, and into the inhibition state when the control signal SW is at the high logic level.

In addition, the second control terminal 58b is connected to the gate terminal of a second PMOS confirm transistor 65, which has its source terminal connected to the supply line 28 and its drain terminal connected to the excitation node 57.

Operation of the enable circuit 12 is the following. The power-up signal POR has a pulse (high logic level) when the supply voltage $V_{CC}$ is below a preset threshold, and, consequently, at power-up of the memory 1, on the gate terminal of the power-up transistor 37 a high logic level is present, which corresponds to a voltage value approximately equal to that of the supply voltage $V_{CC}$. Consequently, the power-up transistor 37 is on, and the first node 39 is low. The first confirm inverter 40 and second confirm inverter 41 force the low logic level (close to ground) on the first node 39 and the high logic level on the second node 42, the high logic level propagating, through the chain of delay inverters 45, as far as the gate terminal of the activation transistor 46, thus turning this transistor on.

The natural transistor 48 is, instead, initially off. As shown previously, in fact, the control voltage $V_L$ is at the first, higher, control voltage, given by Equation (1), and consequently the natural transistor 48 has a gate-to-source voltage lower than the natural threshold voltage $V_{TP}$, and is inhibited.

The activation node 47 is thus at the low logic level, while the first (high) logic level of the pump enable signal PE is on the pump enable output 17, because of the presence of the output inverter 50, and determines activation of the read charge pump 13, as described previously with reference to FIG. 1.

Furthermore, in the described condition, the control signal SW is at the high logic level, owing to the presence of the input inverter 62, and brings the transfer gate 58 in the inhibition state, preventing transmission of the chip enable signal CE. The second confirm transistor 65, which receives the low logic level on its gate terminal, and hence is on, maintains the excitation node 57 at the high logic level and inhibits generation of pulses by the monostable circuit 60.

When the read voltage $V_R$ reaches the nominal value, the control voltage $V_L$ decreases, as described previously, and reaches the second control value, so turning on the natural transistor 48. Since the natural transistor 48 is sized so as to be more conductive than the activation transistor 46, the activation node 47 is brought to the high logic level, and hence the output inverter 50 switches, setting the pump enable signal PE at the second (low) logic level. The read charge pump 13 is thus deactivated, while the standby charge pump 14 (FIG. 1) is kept in operation to maintain the read voltage $V_R$ at the nominal value. In addition, the reset transistor 53 is turned on by the reset inverter 52 and brings the second node 42 to the low logic level. Consequently, the activation transistor 46 is inhibited, while the confirm transistor 54 starts conducting, so confirming the high logic level present on the activation node 47.

In practice, the reset transistor 37, the first confirm inverter 40 and second confirm inverter 41 defines a bistable type memory circuit, which is set by the power-up signal POR and reset by the reset transistor 53.

When the memory 1 is started up in the standby state, the enable stage 35 remains in the condition that has been described until a read or write operation is requested. If, instead, the memory 1 is immediately set in the active state and hence the chip enable signal CE has an active value, the control voltage $V_L$ supplied by the voltage regulator 11 oscillates between the first control value and the second control value according to whether the read voltage $V_R$ is lower than or equal to the nominal value, as described above with reference to FIGS. 1 and 2. Consequently, the read charge pump 13 is alternately activated and deactivated by the pump enable signal PE, so maintaining the read voltage $V_R$ close to the nominal value.

In practice, the pump enable signal PE determines activation of the read charge pump 13 at powering up of the memory 1 and during reading.

In addition, when the read voltage $V_R$ reaches the nominal value and, owing to the presence of the reset circuit 51, the second node 42 goes to the low logic level, the first and second confirm inverters 40, 41 force the high logic level on the first node 39. Consequently, the input inverter 62 of the sync stage 36 switches and brings the control signal SW to the low logic level, so as to set the transfer gate 58 in the conduction state and to inhibit the second confirm transistor 65.

The chip enable signal CE can thus be brought to the excitation node 57 and to the inputs of the monostable circuit 60. In particular, if the memory 1 is started up in standby, the chip enable signal CE is at the non-active (high) value, which is equal to the logic level already present on the excitation node 57 before switching of the input inverter 62. Consequently, the monostable circuit 60 is not excited and does not generate any pulse (the power-up sync signal ATDS remains low, and reading is not started).

If, instead, a read operation is requested immediately, the chip enable signal CE is set at the active (low) level. Consequently, as soon as the read voltage $V_R$ reaches the nominal value, the control signal SW sets the transfer gate 58 in the conduction state and enables transfer of the active (low) level to the inputs of the monostable circuit 60 (the second confirm transistor 65 is inhibited, as explained above). The monostable circuit 60 is thus excited, and the power-up sync signal ATDS has a pulse of a preset duration, thus determining reading.

The voltage boosting device according to the present invention affords the advantages described in what follows.

First, the use of the read charge pump 13 at power-up enables power-up to be speeded up considerably even when the memory 1 is initially set in standby. In fact, the read charge pump 13 has high performance and is able to charge the output terminal 10 much faster than the standby charge pump 14. In addition, the overall consumption of the voltage boosting device is low, in that the read charge pump 13 is deactivated as soon as the read voltage $V_R$ reaches the nominal value.

A further advantage is represented by the possibility of generating a power-up sync pulse as soon as the read voltage presents a sufficiently high value. In this way, it is possible to carry out read operations directly at power-up of the memory 1, without waiting for further clock cycles.

Finally, it is clear that numerous variations and modifications may be made to the voltage boosting device described and illustrated herein, without thereby departing from the scope of the present invention. Hence the invention is to be limited only by the appended claims and the equivalents thereof.

What is claimed is:

1. A voltage boosting device, comprising: a voltage regulator and a charge pump having an output terminal supplying a read voltage having a nominal value; said voltage regulator having a regulation terminal connected to said output terminal and a control output supplying a control voltage that has a first control level when said read voltage is lower than a preset value; said read charge pump having an enable terminal and an output connected to said output terminal; and an enable circuit having a first input connected to said control output, a second input receiving a power-up signal, and a pump enable output connected to said enable terminal of said charge pump and supplying a pump enable signal; said pump enable signal being set at a first logic level for activating said charge pump at least upon receiving said power-up signal.

2. The device of claim 1, wherein said enable circuit comprises:
   memory means having an input connected to said second input of said enable circuit and an output supplying a power-up memory signal switching to a first level upon receiving said power-up signal (POR); and
   activation means having inputs connected to said control output and to said first node, and an activation node connected to said pump enable terminal for supplying said pump enable signal in the presence of the first level of a bistable reset signal and as long as said control voltage has said first control value.

3. The device of claim 2, wherein said memory means are of a bistable type and wherein said enable circuit further comprises a reset circuit having an input connected to said pump enable terminal and an output connected to said memory means and supplying a reset signal for said memory means.

4. The device of claim 2, wherein said memory means comprise a power-up transistor having its drain terminal connected to said first node and receiving on a gate terminal said power-up signal.

5. The device of claim 4, wherein said activation means comprise a first activation transistor and a second activation transistor; said first activation transistor having its gate terminal connected to said output of said memory means, its source terminal connected to a reference potential line, and its drain terminal connected to said activation node; said second activation transistor having its gate terminal connected to said control output of said voltage regulator, its source terminal connected to a supply line, and its drain terminal connected to said activation node.

6. The device of claim 5, wherein said second activation transistor is a PMOS natural transistor.

7. The device of claim 3, wherein said reset circuit comprises a reset transistor having its source terminal connected to a reference potential line, and its drain terminal connected to said output of said memory means; and a reset inverter connected between said pump enable terminal and a gate terminal of said reset transistor.

8. The device of claim 1, wherein said enable circuit comprises memory means having an input connected to said second input of said enable circuit, and an output supplying a power-up memory signal switching to a first level upon receiving said power-up signal, and comprising a sync stage having a first input, a second input, and a sync output, said first input and second input of said sync stage connected, respectively, to said output of said memory means and to a chip enable terminal supplying a chip enable signal, and said synch output supplying a power-up sync signal having a pulse when said read voltage reaches said nominal value and said chip enable signal is set at an active value.

9. The device of claim 8, wherein said sync stage comprises a monostable circuit connected to said chip enable terminal, and switching means arranged between said monostable circuit and said chip enable terminal and having at least a first control terminal connected to said output of said memory means.

10. The device of claim 9, wherein said switching means comprise a transfer gate.

11. The device of claim 9, wherein said chip enable signal switches between said active value and a non-active value, and said sync stage further comprises a confirm transistor having a control terminal connected to said output of said memory means and supplying said non-active value of said chip enable signal to said monostable circuit in the presence of said first level of said power-up memory signal.

12. The device of claim 2, further comprising a standby charge pump having an output connected to said output terminal.

13. A voltage boosting circuit for a memory having a memory array of rows and columns and including a row decoder, the circuit comprising:
   a charge pump having an output coupled to the row decoder and an input to receive a pump enable signal, the charge pump configured to generate a read voltage at the output in response to the pump enable signal;
   a voltage regulator having a first input configured to receive a chip enable signal, a second input coupled to the charge pump output to receive the read voltage, the voltage regulator configured to generate a control voltage; and
   an enabling circuit having a first input coupled to the voltage regulator and configured to receive the control voltage, a second input configured to receive a power-up signal from a bistable memory circuit, and a third input configured to receive the chip enable signal, the enabling circuit configured to generate the pump enable signal at a first logic level to activate the charge pump in response to receipt of the power-up signal, and, after the read voltage reaches a nominal value as indicated by the control voltage, to maintain the pump enable signal at the first logic level and thereby continue to activate the charge pump when the chip enable signal is active and to generate the pump enable signal at a second logic level to deactivate the charge pump when the chip enable signal is inactive.

14. The circuit of claim 13, further comprising a stand-by charge pump coupled to the output of the charge pump and configured to maintain the read voltage at the nominal level when the charge pump is deactivated.

15. The circuit of claim 13, wherein the enabling circuit is further configured to generate a power-up sync signal at a sync signal output to thereby commence reading of the memory when the read voltage reaches the nominal level and the chip enable signal is active.

16. The circuit of claim 15, wherein the enable circuit comprises a reset circuit having an input coupled to the charge pump input and an output coupled to the bistable memory circuit and configured to generate a reset signal to the bistable memory circuit.

17. The circuit of claim 16, wherein the enable circuit further comprises a sync circuit having a first input coupled to the bistable memory circuit, a second input configured to receive the chip enable signal, and an output coupled to the sync signal output.

18. The circuit of claim 17, wherein the sync circuit comprises a switch circuit having an input configured to receive the chip enable signal and an output, and a monostable circuit having an input coupled to the output of the switch circuit.

* * * * *